July 23, 1946.    F. SALZMANN    2,404,748
THERMAL POWER PLANT
Filed June 12, 1943    2 Sheets-Sheet 2
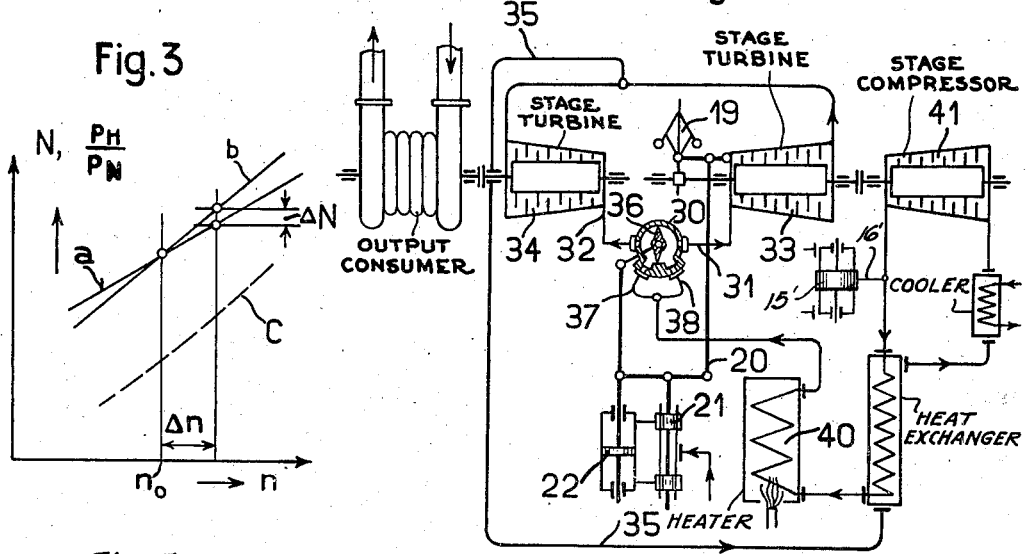
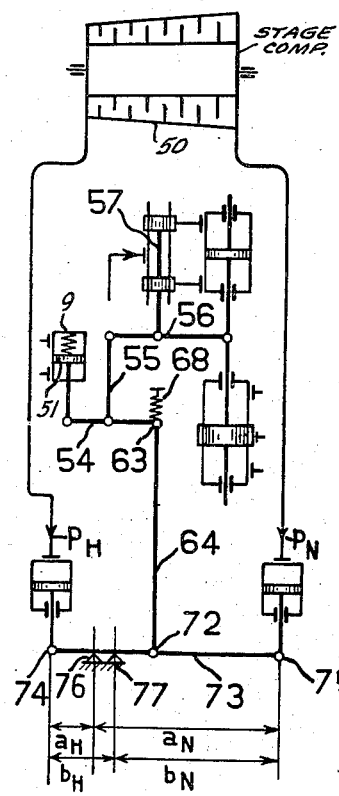
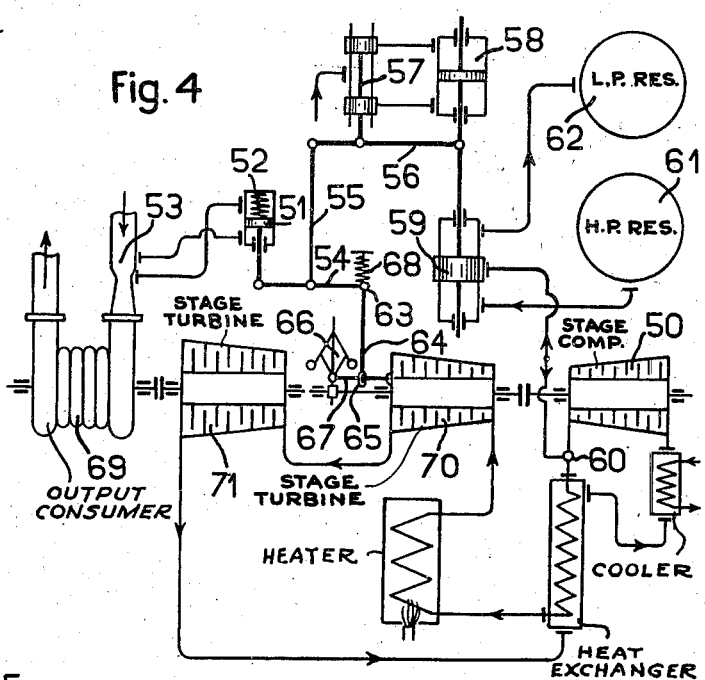
Inventor
Fritz Salzmann
By Dodge and Sims
Attorneys Patented July 23, 1946

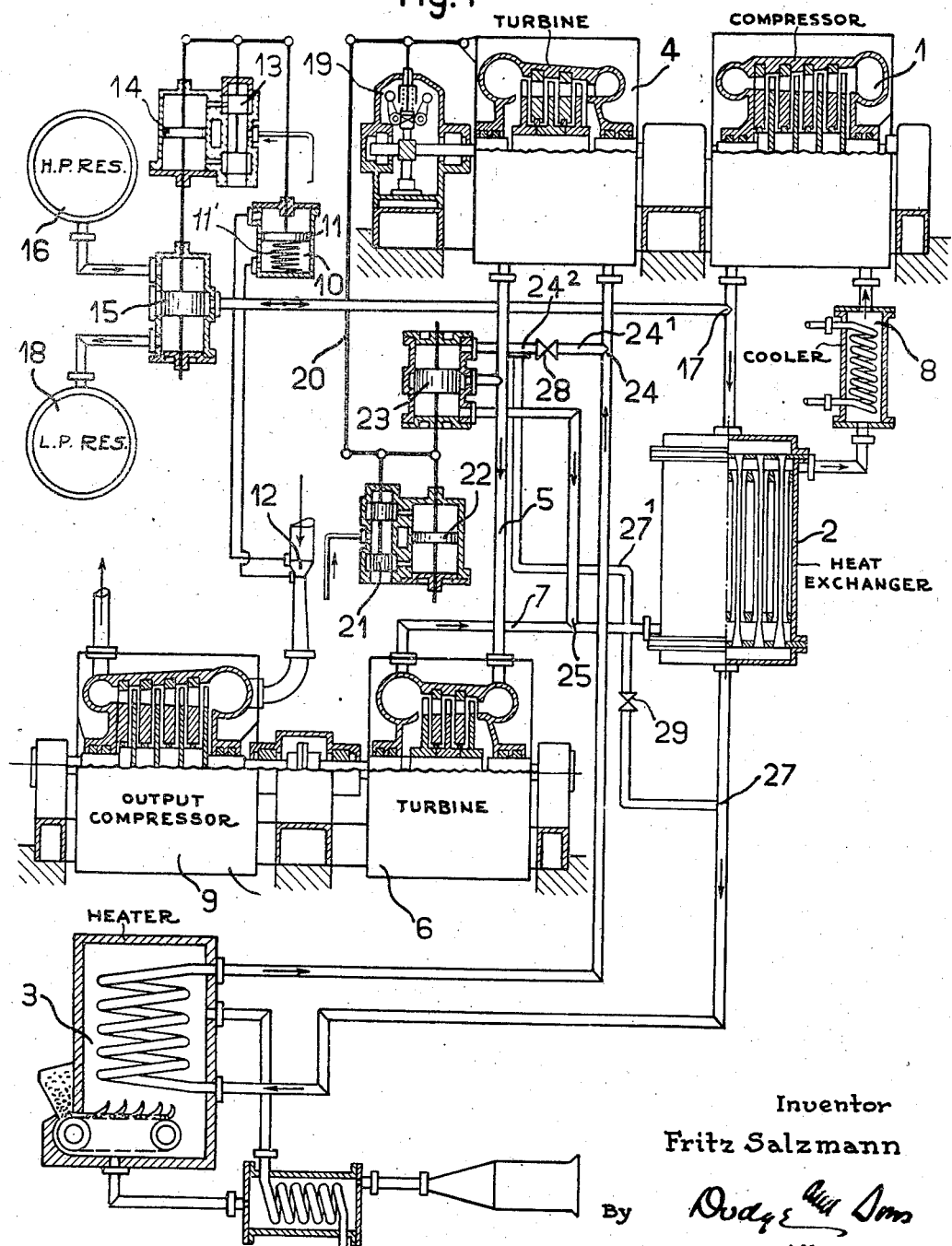

2,404,748

UNITED STATES PATENT OFFICE 2,404,748

THERMAL POWER PLANT

Fritz Salzmann, Zurich, Switzerland, assignor to Aktiengesellschaft Fuer Technische Studien, Zurich, Switzerland, a corporation of Switzerland Application June 12, 1943, Serial No. 490,663
In Switzerland June 26, 1942

14 Claims. (Cl. 60—59)

The present invention relates to a method for the regulation of the output of thermal power plants in which at least the greater part of a gaseous working medium describes a cycle, is raised to a higher pressure in at least one compressor, then heated by a supply of heat from an external source and afterwards expanded in at least one turbine driving said compressor and in at least one further turbine driving a consumer of useful output, the speeds of the turbine driving the compressor and of the turbine driving the consumer of useful output being independent from one another. The invention further relates to an arrangement for carrying out this method.

In plants of this kind a rigid relationship between the speed of the turbine driving the consumer of useful output and that of the turbine driving the compressor acting on the medium describing the cycle and hereinafter called "cycle compressor" is not imposed either by a mechanical or other type of coupling. Consequently, a drive of this kind is particularly advantageous in plants where useful output has to be given up to a consumer, the speed of which varies within wide limits, for example, to a compressor, a blast furnace booster or a pump and the like, or in plants for the propulsion of a ship or locomotive. Hereby, the turbine driving the cycle compressor is preferably operated at a constant or only slightly varying speed, whereas the turbine driving the consumer of useful output participates in any changes in speed to which this consumer is subjected. In this manner it is ensured that the ratio between the highest and lowest pressures prevailing within the cycle remains practically unchanged.

In a plant designed for a given normal speed of the cycle compressor, equilibrium between the power required by said compressor and the power produced by its driving turbine exists substantially at said normal speed and as long as the running conditions remain stable, even at part loads, provided the compressed working medium is always heated to the same temperature and that only the quantity of working medium describing the cycle is varied when the output of the plant has to be altered. However, deviations from the state of equilibrium between said outputs can temporarily occur when passing from one load to another, i. e. at the moment when a change in the pressure level within the cycle takes place, since in such a case the ratio between the highest and lowest pressures in the cycle is temporarily changed owing to a supply or withdrawal of working medium at a given point of the cycle.

Such deviations can arise in a particularly pronounced form when—for instance in order to ensure a rapid drop in output—the action caused by a reduction in the level of pressure prevailing within the cycle, is supplemented by a temporary operation of further means for reducing the useful output of the plant, for example of means for throttling the circulating current of working medium or for opening a by-pass of the cycle compressor.

In order to avoid such larger deviations from the normal speed of the cycle compressor, it is necessary to re-establish the state of equilibrium between the power delivered to this compressor and that consumed by the latter. For this purpose the method according to the present invention prevents, when changes in the useful output given up to the consumer of such output occur and whilst the regulating actions initiated by such changes and tending to re-establish new load conditions are taking place, deviations in the speed of the turbine driving the cycle compressor surpassing or dropping below a prescribed range by limiting temporary deviations in the pressure head dealt with in this turbine from the head which said turbine deals with when a state of equilibrium exists.

Various constructional forms of arrangements for carrying out the new method are shown by way of example in the accompanying drawings, in which:

Fig. 1 shows the application of such an arrangement in a plant wherein a turbine driving the cycle compressor and a turbine driving a consumer of useful output, are traversed in series by the working medium describing the cycle and wherein a change in the pressure head dealt with in the turbine driving the cycle compressor is brought about by releasing a current of working medium which by-passes either stages of this turbine or stages of the turbine driving the consumer of useful output.

Fig. 2 shows the employment of the new arrangement in a plant wherein a turbine driving the cycle compressor and a turbine driving a consumer of useful output are each traversed in parallel by a portion of the working medium of the cycle.

Fig. 3 shows a diagram in which powers N and pressure ratios $$\frac{p_H}{p_N}$$

are plotted against speeds $n$.

Fig. 4 shows a further constructional form in which a regulating device interrupts in dependency on an upper and a lower speed limit the supply of working medium to and the withdrawal of such medium from the cycle, whilst Fig. 5 shows an arrangement in which the means for controlling the supply of working medium to and the withdrawal of such medium from the cycle is influenced in dependency on a pressure ratio.

In the plant shown in Fig. 1 the working medium traverses at first a compressor 1, then a heat exchanger 2, a heater 3 in which heat from an external source is supplied to the working medium, a turbine 4 driving the cycle compressor 1, a pipe 5 connecting turbine 4 to a turbine 6 driving a consumer of useful output 9, here shown as a compressor. From the turbine 6 the flow is by way of pipe 7 to and then through the heat exchanger 2, and thence through a cooler 8 to the inlet of cycle compressor 1, thus completing the circuit. Gaseous working medium leaving compressor 1 is heated in exchanger 2 by gaseous medium flowing toward compressor 1, so that the latter is partially cooled before entering cooler 8.

The power output is regulated by changing the pressure level within the cycle. The particular regulating device is influenced by a volume governor 10, the piston 11 of which is under the influence of a Venturi nozzle 12 arranged in the suction pipe of said compressor 9. To the piston 11 a distributing valve 13 is operatively connected, which controls the supply of working medium to a servomotor 14. The latter operates a valve 15 which, on being displaced downwards from its mid-position shown on the drawings, allows working medium to flow from a high-pressure storage reservoir 16 into the cycle at point 17, whilst on being displaced upwards from its center position, it allows working medium from the cycle to pass into a low-pressure storage reservoir 18.

If the quantity of medium delivered by the compressor 9 is too small so that the action brought about by the Venturi nozzle 12 becomes less effective, then the piston 11 is raised by spring 11'. The distributing valve 13 now permits liquid under pressure to flow to the space above the piston of the auxiliary servomotor 14 and as a consequence of this, said piston is moved downwards. As a result of this, valve 15 allows working medium to flow from the high-pressure storage reservoir 16 into the cycle until such time as the output of the plant suffices to raise the speed of turbine 6 and compressor 9 to such a degree as to enable the latter to deliver the volume required.

To bring about a state of equilibrium between the output of turbine 4 and the power consumption of compressor 1, a centrifugal governor 19 is provided for this set, which is operatively connected by a rod 20 to a distributing valve 21. This valve 21 controls the supply of pressure medium to an auxiliary servomotor 22 operating in its turn a valve 23 which in the position below its mid-position brings about a connection between pipe 5, connecting the turbines 4 and 6, and a point 24 of the cycle situated before the turbine 4; on the other hand, in the positions above its mid-position said valve 23 opens a connection between the pipe 5 and a point 25 of the cycle, which lies behind the outlet of turbine 6, seen in the direction in which the working medium flows.

If the turbine 4 develops a larger output than can be consumed by compressor 1, i. e. if this turbine deals with a larger pressure drop than when a state of equilibrium exists between output and consumption, the speed of this set 4, 1 increases and the centrifugal governor 19 therefore deflects, so that rod 20 moves upwards and together therewith valve 21. The result of this is that the piston of the auxiliary servomotor 22 is moved downwards, so that working medium can, by by-passing the turbine 4 driving compressor 1, flow from point 24 of the cycle through pipes $24^1$, $24^2$ immediately into the connecting pipe 5. In such a case the pressure head available for turbine 4 is restored to the value necessary for maintaining equilibrium between output and consumption. The valve 23 keeps said connection open until such time as a state of equilibrium between the output of the trbine 4 and the power consumed by the compressor 1 has been re-established. In this manner temporary deviations in the pressure head dealt with in turbine 4 from that dealt with when stable working conditions exist, are prevented. On the other hand, if the output of turbine 4 is not sufficient, the speed of the set 1, 4 drops, as a result of which an opposite movement of the piston of the auxiliary servomotor 22 is initiated, i. e. the valve 23 is now raised so that a current of working medium can by-pass the turbine 6 driving the compressor 9. When this is the case, the head available for the turbine 4 is increased, so that the desired equilibrium between output and consumption is re-established.

The fact that the measures referred to involve simultaneously a change in the pressure heads dealt with in both turbines (and this moreover in an opposite sense) does not restrict the application of the invention, since the output of useful energy can again be corrected by a corresponding adjustment of the pressure level prevailing within the cycle.

As shown in Fig. 1, speed variations of turbine 4 above and below a given range are prevented by causing working medium to by-pass turbine 4 as an entirety or turbine 6 as an entirety. It is convenient to by-pass each turbine as an entirety because the connections are simple, but no limitation to these specific connections is implied. The use of a by-passed flow for stabilizing purposes is the significant thing so far as the broad aspects of the invention are concerned, and various arrangements availing of this idea are obviously possible.

Furthermore, when a turbine installed immediately behind the heater 3 is by-passed as a whole or only with regard to some of its stages, then said heater may also be temporarily by-passed, either entirely or partially, so that no high temperature working medium can pass into turbine stages normally subject to lower temperatures than that of the by-pass current and which are therefore made of materials having only a low heat resistance.

Such a possibility is indicated in Fig. 1 by a pipe $27^1$ branching off at a point 27 from the cycle. According to the adjustment of valves 23 and 29, pipes $24^1$, $24^2$ or pipes $27^1$, $24^2$ can be employed for by-passing.

When the valve 23 overlaps the control opening to a certain extent, the possibility also exists of providing in connection with the means for limiting temporary deviations in the pressure head a certain range wherein no action takes place, so that unnecessary flow losses, which would occur, when the speed of turbine 4 only slightly deviates from its normal speed, can be avoided.

In the case where the turbine driving the cycle compressor and the turbine driving the consumer of useful output are each traversed in parallel by a current of working medium, a change in the pressure head of the first mentioned turbine can be brought about by throttling one of said two currents of working medium. The pressure head of the turbine driving the cycle compressor is then reduced when throttling the current of working medium flowing through this turbine, whilst it is increased when throttling the current of working medium flowing through the turbine driving the consumer of useful output. In this connection it is of no importance whether the throttling action takes place at the inlet, at the outlet, or between stages of the respective turbine.

In Fig. 2 a plant is shown with an arrangement for throttling the current of working medium at the turbine inlet. In this embodiment of the invention the current of working medium leaving a heater 40 is divided in a chamber 30 into two currents passing through pipes 31 and 32. These currents, after having expanded on the one hand in turbine 33 driving the cycle compressor 41 and on the other hand in turbine 34 driving a consumer of useful output, pass through a common pipe 35, whereupon they describe the same cycle as already described above with reference to Fig. 1, 16¹ denoting a pipe connected to a valve 15' controlling the supply of working medium to and its discharge from the circuit, and thus corresponding to valve 15 of Fig. 1. In this case also, a change in the position of the centrifugal governor 19 initiates a movement of the piston of the auxiliary servomotor 22, this piston operating in its turn a throttle valve 36, which throttles either the supply of working medium to pipe 31 or to pipe 32. The first takes place when as a result of surplus output being developed by turbine 33, a rise in speed is brought about, so that the piston of the auxiliary servomotor 22 is moved downwards and valve 36 consequently turned in a counter-clockwise sense. Inversely, if the output developed by turbine 33 is insufficient, thus involving a drop in the speed of set 33, 41, the valve 36 is moved in a clockwise sense as a result of which it throttles the supply of working medium to turbine 34. This causes a rise in pressure at the inlet to turbine 33, so that the output is again increased.

It is admissible to allow the set 33, 41 to operate freely within a certain range of speeds, the current of working medium being only throttled when said range has been surpassed or after the speed has dropped below said range. Such a possibility exists when the current of working medium is, in the manner shown in Fig. 2, distributed over two inlet openings 37 and 38 of the chamber 30. A displacement of valve 36 from its mid-position then remains without effect as long as it moves within the space provided between the two openings 37 and 38.

Although it does not impair the application of the invention whether the turbine driving the cycle compressor and the turbine driving the consumer of useful output are traversed by the working medium in parallel or in series, and the latter in the one or other sequence, it is nevertheless advantageous if the turbine driving the cycle compressor and arranged in series with the turbine driving the consumer of useful output, is first traversed by the working medium. In the latter case an automatic compensation between the available output and that consumed by the cycle compressor is brought about, at least to a certain extent, provided smaller fluctuations in the speed of this compressor are admissible. As may be seen from Fig. 3, with increasing speed $n$ the power consumption $b$ of the cycle compressor rises more quickly than the power output $a$ of its driving turbine, since with increasing speed $n$ the ratio brought about by the cycle compressor between highest and lowest pressure occurring in the cycle becomes greater. To the greater power consumption a total output of the two turbines, which has been increased by almost the same relationship, now corresponds. In such a case, however, it is well known that when the pressure ratio between initial pressure and final pressure has been raised, the turbine first traversed by the working medium produces only a small fraction of the total output.

If equilibrium between the output produced and that consumed is normally attained at the speed $n_0$ (Fig. 3) and if for any reason the output of the turbine driving the cycle compressor is now excessive by an amount $\Delta N$, this set is accelerated until the power consumption of the cycle compressor is by an amount $\Delta N$ greater than the output of its driving turbine. This is the case at a speed which has been raised by an amount $\Delta n$. Inversely, when the output of the turbine is insufficient, the equilibrium between output produced and that consumed is reestablished at a speed lying somewhat below $n_0$.

If in a plant of the kind herein described an alteration in the pressure level is required owing to a change in the power consumption of the receiver of useful output having taken place, the pressure heads dealt with in the turbine, and particularly that dealt with in the turbine driving the cycle compressor, will, as long as working medium is supplied or withdrawn at a point of the cycle, deviate from the head dealt with when stable conditions in the plant exist. When working medium is supplied to the cycle in front of the inlet to the turbine driving the cycle compressor, the pressure head dealt with by this turbine is increased so that it produces more power than is actually required; on the other hand when withdrawing working medium, the power decreases so that a lack of output results. Deviations of this kind are greater, the more working medium is supplied or withdrawn within a given unit of time. Consequently, unless a control device comes into action, the speed of the turbine driving the cycle compressor tends to reach a higher equilibrium speed the quicker working medium is supplied to the cycle, whilst it will endeavour to reach a lower equilibrium speed the quicker the working medium is withdrawn.

If the consumer of useful output is of such a kind that a particularly quick adaptation of the useful energy output to the changed load can be dispensed with, it is permissible to limit excessive deviations of the pressure head dealt with in the turbine driving the cycle compressor from that dealt with when stable working conditions exist and thus to prevent the speed of this turbine from surpassing or dropping below a prescribed, admissible range, by temporarily preventing with the aid of a controlling device influenced by the speed of the cycle compressor a further supply of working medium to the cycle when an upper speed limit is surpassed and by preventing a further withdrawal of working medium when the speed drops below a given lower limit.

Since to the equilibrium speed which the cycle compressor set temporarily tends to reach when a given quantity of working medium is supplied to or withdrawn from the cycle within a unit of time, i. e. as long as the supply or withdrawal continues, a given ratio between the delivery pressure $p_H$ and the suction pressure $p_N$ of this compressor is coordinated, which ratio is greater the higher the equilibrium speed curve C in Fig. 3), the regulator which temporarily limits the quantity of working medium supplied to or withdrawn from the cycle can likewise be influenced by the pressure ratio $p_H/p_N$ instead of by the speed of the cycle compressor. This can be effected in such a manner that on a given upper limit of this ratio being surpassed, a further supply of working medium to the cycle is prevented, whilst on a given lower limit of this ratio being passed, a further withdrawal of working medium from the cycle can no longer take place.

An arrangement provided with a controlling device which prevents a further supply or withdrawal of working medium to or from the cycle in dependency on an upper and a lower limit speed respectively, is illustrated in Fig. 4. Hereby it is assumed that the output produced by the plant will be influenced by the power consumption of the compressor 50 which it drives. A controlling device 51, the piston of which is kept in a state of equilibrium by a spring 52 and the pressure differences occurring in a Venturi nozzle 53 inserted in the suction pipe of a compressor 69, is operatively connected by rods 54, 55, 56 to a slide valve 57 which governs the supply of pressure medium to a servomotor 58. The latter operates a valve 59 which, when being displaced from the mid-position shown on the drawings, connects point 60 of the cycle either to a high-pressure reservoir 61 or to a low-pressure reservoir 62, so that working medium is either supplied to the cycle from the first mentioned reservoir or withdrawn from the cycle, in which latter case it flows into the low-pressure reservoir 62. To the beam 54 a rod 64 is further articulated at point 63, a longitudinal slot 65 being provided at the lower end of said rod 64. A pin on lever 67 connected to centrifugal governor 66 has limited lost motion in the slot 65, the parts being so arranged that the governor does not shift fulcrum 63 until speed has changed a definite amount from normal. The fulcrum 63 is maintained in the mid-position by spring 68.

If now, for example, the volume delivered by the compressor 69 consuming useful output is insufficient, the piston of the controlling device 51 moves downwards and since, for the time being, the point 63 acts as a fixed fulcrum for beam 54, the slide valve 57 will be caused to move downwards. As a result hereof the piston of servomotor 58 moves upwards and the valve 59 consequently permits working medium to flow from reservoir 61 into the cycle at point 60. The turbines 70 and 71 now immediately receive more power, the turbine 70 producing, whilst working medium is supplied to the cycle, more power than the compressor 50 consumes, so that its speed rises. As soon as a given upper speed limit is reached, the centrifugal governor 66 will have raised the lever 67 to such an extent that the above mentioned pin of this lever will have overcome the clearance within the slot 65 so that rod 64 is lifted against the action of spring 68. As a result hereof, the valve 57 is moved back in an upward direction by rods 54, 55, 56, so that finally valve 59 is returned to its mid-position, thus preventing a further supply of working medium to the cycle until a supply of working medium is again possible owing to a drop in speed below that corresponding to the normal state of equilibrium.

When a drop in load occurs, at the commencement of which, for example, the volume delivered by compressor 69 is too great, the movements of the above described regulating gear take place in the opposite sense. Working medium is now discharged from the cycle into the reservoir 62. The drop in speed which follows causes the pin of lever 67 to pass through the clearance in slot 65 in a downward direction and on the lower limit speed being reached, it likewise pulls down rod 64. The upward movement of the slide valve 57 which had taken place is thus neutralized and a further discharge of working medium therefore prevented.

Fig. 5 finally shows an arrangement in which the means for temporarily preventing a supply and withdrawal of working medium are influenced by the pressure ratio $p_H/p_N$ in the manner already described above. In Fig. 5 the parts corresponding to those of Fig. 4 are denoted by the same reference as in the latter figure. In this further embodiment the lower end of rod 64 is articulated at point 72 to a beam 73, which is acted upon at its two ends 74 and 75 by forces proportional to the cycle pressures $p_H$ and $p_N$ respectively. At points 76 and 77 the beam 73 rests on knife edges, which divide the whole length of the beam into stretches $a_H$, $a_N$ and $b_H$, $b_N$ respectively. If now $$\frac{p_H}{p_N} > \frac{a_N}{a_H}$$

the beam 73 is turned in a counter-clockwise sense around point 76 so that rod 64 is raised, i. e. the same effect is caused as when the speed in an arrangement according to Fig. 4 is increased. If, on the other hand, $$\frac{p_H}{p_N} < \frac{b_H}{b_N}$$

then beam 73 is turned in a clockwise sense around the point 77 and rod 64 consequently moved downwards. In between the foregoing, i. e. when $$\frac{b_N}{b_H} < \frac{p_H}{p_N} < \frac{a_N}{a_H}$$

the rod 73 remains stationary and the point 63 becomes a fixed fulcrum for the lever 54. The ratio $$\frac{b_N}{b_H}$$

represents the smallest admissible pressure relationship and $$\frac{a_N}{a_H}$$

the highest admissible. The pressure relationship $$\frac{p_H}{p_N}$$

normally prevailing in the cycle should lie in between. The conditions represented in Fig. 5 correspond approximately to a normal pressure ratio 4, a highest ratio 5 and a lowest pressure ratio 3.

What is claimed is:

1. Method for the regulation of the output of a thermal power plant, in which at least the greater part of a gaseous working medium describes a cycle, is raised in at least one compressor to a higher pressure, then heated by a supply of heat from an external source and afterwards expanded in at least one turbine driving said cycle compressor and further in at least one turbine driving a consumer of useful output, and in which plant the turbine driving the cycle compressor and the turbine driving the consumer of useful output operate at speeds which are independent from one another, consisting in regulating changes in output of the turbine driving the consumer of useful energy by varying the density of the working medium describing the cycle substantially proportionally to such changes, and in preventing deviations in the speed of the turbine driving the cycle compressor and which are brought about by changes in the output of the turbine driving the consumer of useful output and tend to re-establish a new state of equilibrium, above and below a prescribed range by limiting temporary deviations of the pressure head dealt with in the turbine driving the cycle compressor from the head which this turbine deals with when stable working conditions exist.

2. Method for the regulation of the output of a thermal power plant, in which at least the greater part of a gaseous working medium describes a cycle, is raised in at least one compressor to a higher pressure, then heated by a supply of heat from an external source and afterwards expanded in at least one turbine driving said cycle compressor and further in at least one turbine driving a consumer of useful output, said turbines being traversed in series by the working medium describing the cycle and operating at speeds which are independent from one another, consisting in regulating changes in output of the turbine driving the consumer of useful energy by varying the density of the working medium describing the cycle substantially proportionally to such changes, and in preventing a surpassing of the pressure head dealt with in said turbine driving the cycle compressor when equilibrium exists between the output produced and that consumed, by releasing a current of working medium which by-passes stages of this turbine.

3. Method for the regulation of the output of a thermal power plant, in which at least the greater part of a gaseous working medium describes a cycle, is raised in at least one compressor to a higher pressure, then heated by a supply of heat from an external source and afterwards expanded in at least one turbine driving said cycle compressor and further in at least one turbine driving a consumer of useful output, said turbines being traversed in series by the working medium describing the cycle and operating at speeds which are independent of one another, consisting in regulating changes in output of the turbine driving the consumer of useful energy by varying the density of the working medium describing the cycle substantially proportionally to such changes, and in preventing a drop in the pressure head dealt with in said turbine driving the cycle compressor below that dealt with in this turbine when equilibrium exists between the output produced and that consumed by permitting by-passing flow to occur with reference to the turbine which drives the consumer of useful energy.

4. Method for the regulation of the output of a thermal power plant, in which at least the greater part of a gaseous working medium describes a cycle, is raised in at least one compressor to a higher pressure, then brought to a higher temperature in a heater and afterwards expanded in at least one turbine driving said cycle compressor and further in at least one turbine driving a consumer of useful output, one of the turbines being installed after said heater and said turbines operating at speeds which are independent of one another, consisting in regulating changes in output of the turbine driving the consumer of useful energy by varying the density of the working medium describing the cycle substantially proportionally to such changes, preventing deviations in the speed of the turbine driving the cycle compressor, which are brought about by changes in the output of the turbine driving the consumer of useful output and which tend to reestablish a new state of equilibrium, above and below a prescribed range by temporarily permitting by-passing flow with reference to the turbine installed after the heater and said heater.

5. Method for the regulation of the output of a thermal power plant, in which at least the greater part of a gaseous working medium describes a cycle, is raised in at least one compressor to a higher pressure, then heated by a supply of heat from an external source and afterwards expanded in at least one turbine driving said cycle compressor and further in at least one turbine driving a consumer of useful output, the turbine driving the cycle compressor and the turbine driving the consumer of useful output operating at speeds which are independent from one another, consisting in regulating changes in output of the turbine driving the consumer of useful energy by varying the density of the working medium describing the cycle substantially proportionally to such changes, and in preventing a surpassing of the pressure head dealt with in the turbine driving the cycle compressor when equilibrium exists between the output produced by this turbine and that consumed by throttling the current of working medium flowing through this turbine.

6. Method for the regulation of the output of a thermal power plant, in which at least the greater part of a gaseous working medium describes a cycle, is raised in at least one compressor to a higher pressure, then heated by a supply of heat from an external source and afterwards expanded in at least one turbine driving said cycle compressor and further in at least one turbine driving a consumer of useful output, said turbines being traversed in parallel by currents of working medium and operating at speeds which are independent from one another, consisting in regulating changes in output of the turbine driving the consumer of useful energy by varying the density of the working medium describing the cycle substantially proportionally to such changes, and in preventing a drop in the pressure head dealt with in the turbine driving the cycle compressor when equilibrium exists between the output produced by this turbine and that consumed by throttling the current of working medium flowing through the turbine which gives up useful output.

7. Method for the regulation of the output of a thermal power plant, in which at least the greater part of a gaseous working medium describes a cycle, is raised in at least one compressor to a higher pressure, then heated by a supply of heat from an external source and afterwards expanded in at least one turbine driving said cycle compressor and further in at least one turbine driving a consumer of useful output, the turbine driving the cycle compressor and the turbine driving the consumer of useful output operating at speeds which are independent from one another, consisting in regulating changes in output of the turbine driving the consumer of useful energy by supplying working medium to or withdrawing such medium from said cycle to an amount which is proportional to the magnitude of said changes, and in limiting temporary deviations in the pressure head dealt with in the turbine driving the cycle compressor from the head dealt with by this set when equilibrium exists between the output produced and that consumed, which deviations are brought about by said supply of working medium to or said withdrawal of such medium from the cycle for the purpose of changing the pressure level therein, by a temporary interruption of any further supply or withdrawal of working medium.

8. Thermal power plant, in which a gaseous working medium, preferably air, describes a cycle, comprising at least one compressor in which the working medium is raised to a higher pressure, an external source of heat in which heat is supplied to the working medium, at least one turbine in which heated medium is expanded and which drives said cycle compressor, at least one further turbine in which working medium is also expanded and which drives a consumer of useful output, said turbines operating at speeds which are independent from one another, means influenced in dependency on the output of the turbine driving the consumer of useful output for supplying working medium to the cycle on an increase of said output occurring and for withdrawing working medium from the cycle on a falling off of said output occurring, and means which permit limiting of temporary deviations in the pressure head dealt with in the turbine driving the cycle compressor from the head dealt with in this turbine when stable working conditions exist.

9. Thermal power plant, in which a gaseous working medium, preferably air, describes a cycle, comprising at least one compressor in which the working medium is raised to a higher pressure, an external source of heat in which heat is supplied to the working medium, at least one turbine in which heated medium is expanded and which drives said cycle compressor, at least one further turbine in which working medium is also expanded and which drives a consumer of useful output, said turbines operating at speeds which are independent from one another, means influenced in dependency on the output of the turbine driving the consumer of useful output for supplying working medium to the cycle on an increase of said output occurring and for withdrawing working medium from the cycle on a falling off of said output occurring, means which permit limiting of temporary deviations in the pressure head dealt with in the turbine driving the cycle compressor from the head dealt with in this turbine when stable working conditions exist, and a speed governor operatively connected to the last mentioned turbine and influencing said means for limiting deviations in the pressure head dealt with in this turbine.

10. Thermal power plant, in which a gaseous working medium, preferably air, describes a cycle comprising at least one compressor in which the working medium is raised to a higher pressure, an external source of heat in which heat is supplied to the working medium, at least one turbine in which heated medium is expanded and which drives said cycle compressor, at least one further turbine in which working medium is also expanded and which drives a consumer of useful output, said turbines operating at speeds which are independent from one another, means influenced in dependency on the output of the turbine driving the consumer of useful output for supplying working medium to the cycle on an increase of said output occurring and for withdrawing working medium from the cycle on a falling off of said output occurring, a speed governor operatively connected to said turbine driving the cycle compressor, means acted upon by said speed governor for increasing the pressure head dealt with in the turbine driving the cycle compressor only after the speed of this turbine has dropped by a certain degree below the normal speed, and means also acted upon by said speed governor for reducing the pressure head dealt with in the turbine driving the cycle compressor only after the speed of this turbine has risen to a certain degree above the normal speed.

11. Thermal power plant, in which a gaseous working medium, preferably air, describes a cycle comprising at least one compressor in which the working medium is raised to a higher pressure, an external source of heat in which heat is supplied to the working medium, at least one turbine in which heated medium is expanded and which drives said cycle compressor, at least one further turbine in which working medium is also expanded and which drives a consumer of useful output, said turbines operating at speeds which are independent from one another, means influenced in dependency on the output of the turbine driving the consumer of useful output for supplying working medium to the cycle on an increase of said output occurring and for withdrawing working medium from the cycle on a falling off of said output occurring, a controlling device influenced in dependency on the relationship between the suction and delivery pressures of said cycle compressor, means influenced by said controlling device for increasing the pressure head dealt with in said turbine driving the cycle compressor when said relationship exceeds a prescribed range, and means also influenced by said controlling device for reducing the pressure head dealt with in the turbine driving the cycle compressor when this relationship falls below a prescribed range.

12. Thermal power plant, in which a gaseous working medium, preferably air, describes a cycle, comprising at least one compressor in which the working medium is raised to a higher pressure, an external source of heat in which heat is supplied to the working medium, at least one turbine in which heated medium is expanded and which drives said cycle compressor, at least one further turbine in which working medium is also expanded and which drives a consumer of useful output, said turbines being arranged in series and operating at speeds which are independent from one another, means influenced in dependency on the output of the turbine driving the consumer of useful output for supplying working medium to the cycle on an increase of said output occurring and for withdrawing working medium from the cycle on a falling off of said output occurring, pipes for by-passing stages of said turbine driving the cycle compressor and also stages of said turbine giving up useful output, and adjustable shutting-off means fitted in said pipes.

13. Thermal power plant, in which a gaseous working medium, preferably air, describes a cycle, comprising at least one compressor in which the working medium is raised to a higher pressure, an external source of heat in which heat is supplied to the working medium, at least one turbine in which heated medium is expanded and which drives said cycle compressor, at least one further turbine in which working medium is also expanded and which drives a consumer of useful output, said turbines being arranged in parallel and operating at speeds which are independent from one another, means influenced in dependency on the output of the turbine driving the consumer of useful output for supplying working medium to the cycle on an increase of said output occurring and for withdrawing working medium from the cycle on a falling off of said output occurring, and throttling means controlling the supply of working medium to said turbine driving the cycle compressor and to said turbine giving up its output to a consumer of useful output.

14. Thermal power plant, in which a gaseous working medium, preferably air, describes a cycle, comprising at least one compressor in which the working medium is raised to a higher pressure, an external source of heat in which heat is supplied to the working medium, at least one turbine in which heated medium is expanded and which drives said cycle compressor, at least one further turbine in which working medium is also expanded and which drives a consumer of useful output, said turbines operating at speeds which are independent from one another, means influenced in dependency on the output of the turbine driving the consumer of useful output for supplying working medium to the cycle on an increase of said output occurring and for withdrawing working medium from the cycle on a falling off of said output occurring, and regulating devices for temporarily limiting the supply of working medium to the cycle and the withdrawal of working medium therefrom for the purpose of limiting deviations in the pressure head dealt with in said turbine driving the cycle compressor from the pressure head dealt with therein when equilibrium exists between the output produced by this turbine and that consumed.

FRITZ SALZMANN.